United States Patent [19]

Ruter et al.

[11] Patent Number: 5,467,018
[45] Date of Patent: Nov. 14, 1995

[54] METHOD OF PROCESSING TRANSIENT ELECTROMAGNETIC MEASUREMENTS IN GEOPHYSICAL ANALYSIS

[75] Inventors: Horst Ruter, Witten; Kurt-Martin Strack, Cologne, both of Germany

[73] Assignee: Bergwerksverband GmbH, Germany

[21] Appl. No.: 927,417

[22] PCT Filed: Mar. 20, 1991

[86] PCT No.: PCT/DE91/00238

§ 371 Date: Nov. 12, 1992

§ 102(e) Date: Nov. 12, 1992

[87] PCT Pub. No.: WO91/14954

PCT Pub. Date: Oct. 3, 1991

[30] Foreign Application Priority Data

Mar. 21, 1990 [DE] Germany ............ 40 09 055.8

[51] Int. Cl.$^6$ .................. G01V 3/02; G01V 3/08
[52] U.S. Cl. .......... 324/336; 324/354; 340/870.11
[58] Field of Search ............... 324/336, 334, 324/333, 332, 344, 350, 354; 340/853.1, 870.11, 855.4, 855.5

[56] References Cited

U.S. PATENT DOCUMENTS

| | | | |
|---|---|---|---|
| 3,737,768 | 6/1973 | Lazenby et al. | 324/336 |
| 4,247,821 | 1/1981 | Buselli et al. | 324/336 |
| 4,417,210 | 11/1983 | Rocroi et al. | 324/336 |
| 4,535,293 | 8/1985 | Rocroi et al. | 324/336 |
| 4,703,279 | 10/1987 | Chapman et al. | |
| 4,718,011 | 1/1988 | Patterson, Jr. | 364/422 |

FOREIGN PATENT DOCUMENTS

| | | |
|---|---|---|
| 24961 | 3/1981 | European Pat. Off. . |
| 108903 | 5/1984 | European Pat. Off. . |
| 0226366 | 6/1987 | European Pat. Off. . |
| WO8809940 | 12/1988 | WIPO . |
| 91-04502 | 4/1991 | WIPO ............ 324/336 |

OTHER PUBLICATIONS

Kaufman, "Harmonic and Transient Fields on the Surface of a Two–Layer Medium", *Geophysics* vol. 44, No. 7, Jul. 1979, pp. 1208–1217.

Anderson et al, "Transient Response of Some Borehole Mandrel Tools", *Geophysics*, vol. 54, No. 2; Feb. 1989, pp. 216–224.

*Primary Examiner*—Sandra L. O'Shea
*Assistant Examiner*—Warren S. Edmonds
*Attorney, Agent, or Firm*—Price, Heneveld, Cooper, DeWitt & Litton

[57] ABSTRACT

A method of geophysical analysis includes transmitting an electromagnetic signal into the earth and measuring the resulting transmission of that signal through the earth to a plurality of spaced recording units. The values of the transmitted signal are locally digitized and stored at each recording unit. The stored data from each recording unit is subsequently transmitted through a telemetric link to a central processing or analyzing unit, the stored data being transmitted from one recording unit at a time and in a preselected sequence. The data may be transmitted from each recording unit in a block and stored in the central processing unit. The digitizing and storing of the measured values at each unit is accomplished through a yield point amplifier. Automatic drift correction processing may also be applied to the measured values obtained from each recording unit. A microprocessor is installed at each recording unit to process, store, and relay the data measured and to test and control the status of the receiving unit.

20 Claims, 4 Drawing Sheets

METHOD OF PROCESSING TRANSIENT ELECTROMAGNETIC MEASUREMENTS IN GEOPHYSICAL ANALYSIS

BACKGROUND OF THE INVENTION

The invention relates to an installation for the exploration of the subsoil with the aid of transient electromagnetic measurements.

The invention relates specifically to the data collection of transient electromagnetic signals, which are generated in the subsoil to be explored by feeding through a grounded dipole.

If such signals are to supply usable information concerning the structure of the subsoil, the always present interference sources which distort the signals must be avoided on the one hand, whereby, above all, alternating currents and radio signals can disturb the measuring results. On the other hand, it is necessary to set up several remote interspaced measuring points. The erratic changes in the transmitting current diffuse as transients in the subsoil and generate there expanding induction currents. The recording units contain measuring points which each measure different components of the electric and magnetic fields, originating from the induction currents. The invention picks up from a previously known installation of this type. In this installation, the measuring data are processed for the purpose of obtaining a most favorable ratio possible of measuring data and interference data. In the known installation, relay of the measuring data and the recording units into a central unit is required in the original form of the data. This requires that the measuring data are conveyed on separate channels and that they are digitized in the central unit. Because only maximum eight channels can be set up, the number of recording units is therefor limited (U.S. Pat. Nos. 3,737,768, and 4,535, 293). Because the relay lines from the recording units to the central unit have an offset of up to 8 km depending on the requirements of the individual case, mixing in of interference signals cannot be avoided.

It is the objective of the invention to make a more efficient installation, the general construction of which has been described in the introduction, whereby especially the interference signals should be substantially eliminated. The invention solves the objective by locally digitizing and storing at each recording unit, the values that are measured at the recording unit and subsequently transmitting the stored data from each recording unit through a telemetric link to a central processing or analyzing unit, the stored data being transmitted from one recording unit at a time and in a preselected sequence in other aspects of the invention the stored data may be called up from each recording unit in a block and transmitted to and stored in the central unit. The digitizing of the measured values at each recording unit may be processed by a yield point amplifier. Automatic drift correction processing may also be applied to the measured values obtained at each recording unit. And, each recording unit may be provided with a microprocessor to process, store, and relay the data measured at the receiving unit and to test and control the status of the receiving unit.

According to the invention, the analog measuring values obtained by the measuring points via sensors are immediately digitized in the allocated recording unit, whereby the transmission path between the sensors picking up the measuring values and the digitizer can be kept very short. Transmission of the digitized signals occurs exclusively via telemetric link (line), whereby the number of recording units can be increased practically at random. A special advantage of the invention lies thereby in the fact that the frequency range from 0.01 to 0.3 kHz is not subject to any basic restriction due to a number of channels. The installation according to the invention can therefor carry out measurements without loss of quality with widely spaced out measuring points in a territory with strong electric interference.

The signals which are stored and digitized at the recording points are suitably called up individually and relayed to the central station via telemetric digital link. This embodiment of the invention permits calling up the data blocks as needed or in preset time sequence and to place them into the data bank of the central unit. Interpretation of the stored signals can subsequently follow, according to which a quantitative evaluation of the distribution of the electric resistances in the subsoil is possible, whereby the depth area explored can vary between a few meters and several kilometers.

Processing of the analog signals in the recording unit is not a prerequisite of the invention, but can occur, however, by processing with a yield point amplifier to digitize the measured values at each recording unit, for example, if this should be required in the individual case or if the user of the installation wishes this. Processing in these cases includes automatic drift correction in order to prevent the measurements from following a distortion path. Because the components of the electric and magnetic fields originating from the induction currents received at the measuring points are used, the vertical components of the magnetic field or their temporal derivative as well as, in addition, one or several components of the electric field are generally measured. This permits an interpretation with the aid of the Maxwell equations which leads to the above described quantitative evaluation of the electric resistances in the subsoil.

Furthermore, the invention enables the monitoring and control of the recording units, i.e. of their electronic analog components with a microprocessor installed at each recording unit.

Below, the invention is further described using an embodiment example, which is represented in the drawing. Shown are

DESCRIPTION OF THE PREFERRED EMBODIMENTS

Figure 2:
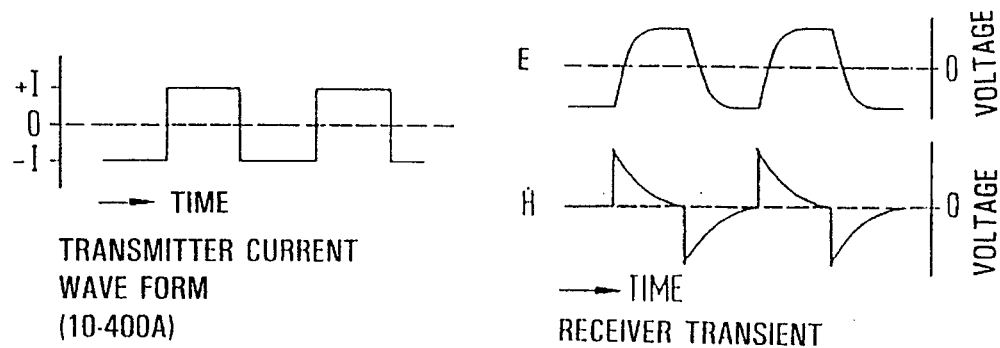
Figure 1:
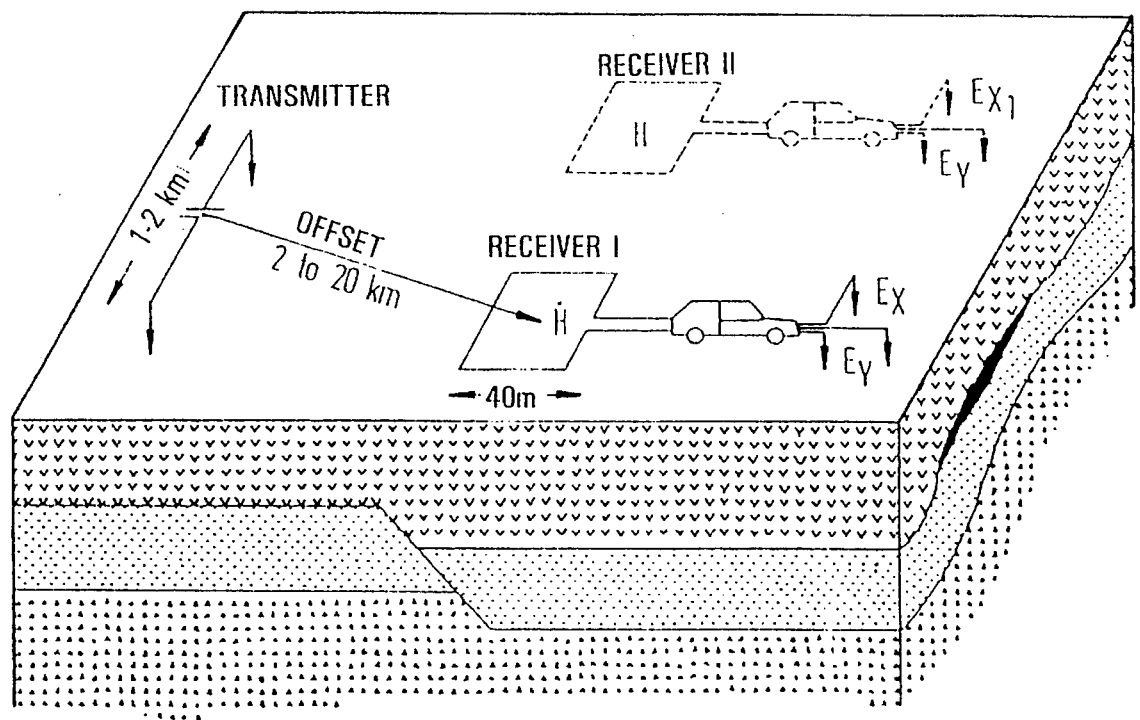
FIG. 1 a typical field arrangement of the measuring installation, whereby however only two recording units for measuring the electromagnetic transients have been drawn, FIG. 2 Signal forms of the transmitting current and of the pertinent transients received, namely E for the electric field and H for the magnetic field of the transient, FIG. 3 a block circuit diagram of the data collection installation according to the invention, FIG. 4 a block circuit diagram of the analog part of the recording unit (RU) and FIG. 5 a block circuit diagram of the digital part of a recording unit (RU).

FIG. 1 shows the principle of an installation for exploring the subsoil with the aid of transient electromagnetic measurements (TEM). The installation contains a transmitter (grounded dipole) and recording units with receivers (spool). Erratic changes in the transmission current diffuse as transients in the subsoil and there expanding induction currents are generated. Those are received at the measuring points, whereby—as is known in the field of geophysical study and analysis, is known to those of ordinary skill in the art, and is described in the introduction—various components of their electric and magnetic fields can be utilized. Examples of signal forms on the transmitter/receiver side are shown in FIG. 2. The signals received decay each time after a short period, and are therefor called transients. They must be interpreted with the aid of Maxwell equations as is known in the field and known by those of ordinary skill in the art, and thus allow a quantitative evaluation of the distribution of the electric resistances in the subsoil, which in turn provide details about the make up of the subsoil.

Figure 3:
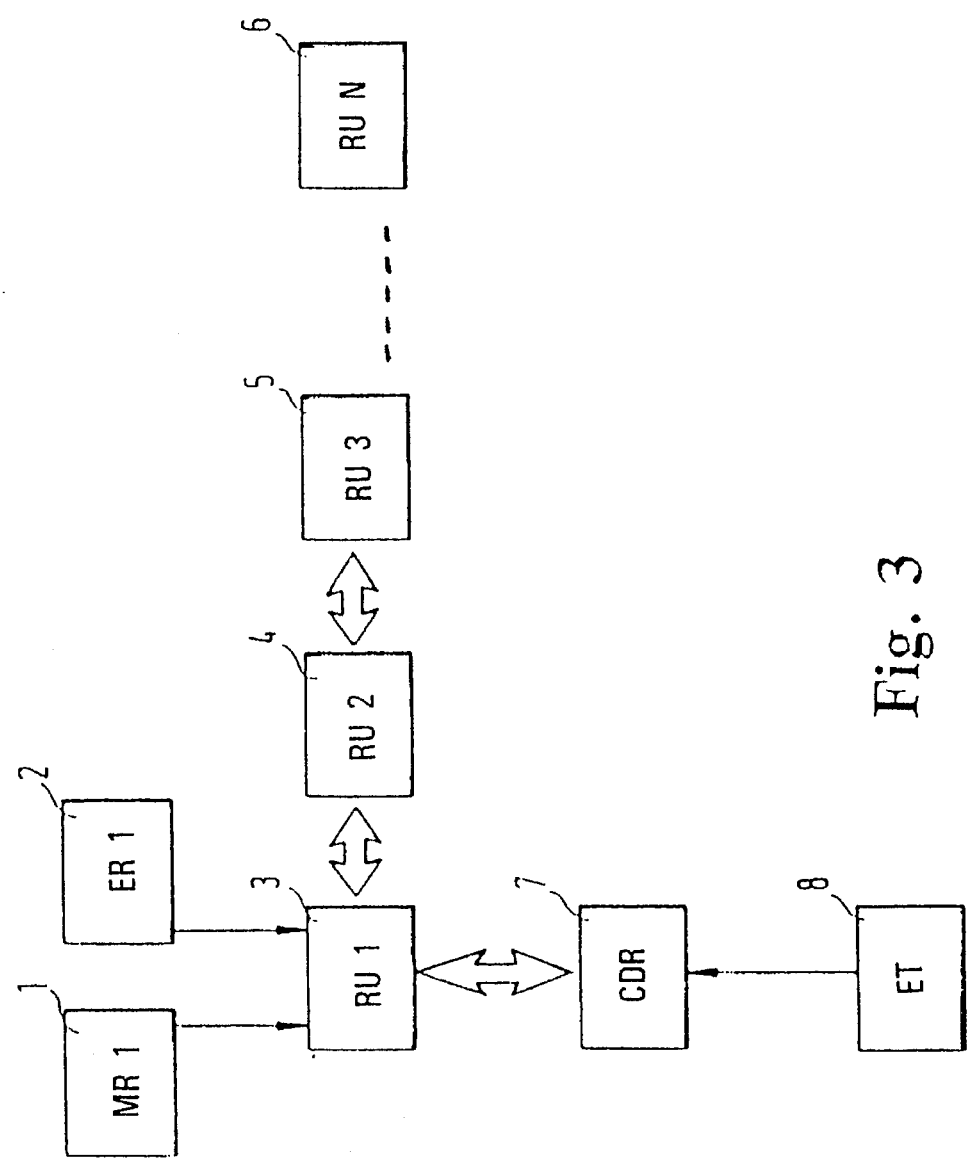
Figure 4:
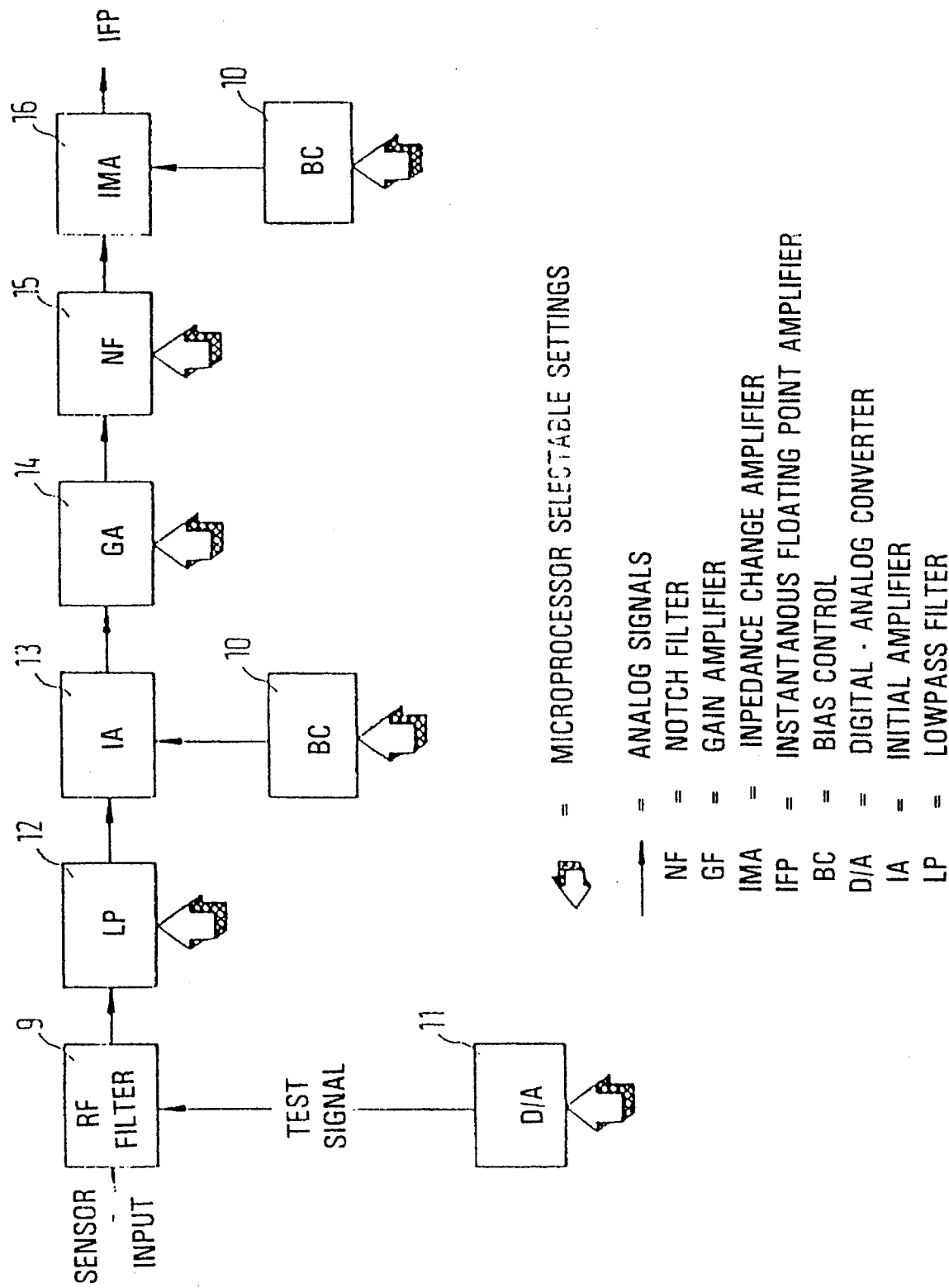

FIG. 3 gives a block circuit diagram of the data collection system according to the invention. The signals received from sensors (1,2) are processed, digitized and intermediately stored at the respective measuring point in the recording units (3–6). The recording units are controlled by central station (7) via a digital telemetry system. All of the recording units (3–6) are linked together with this digital data line and can be connected at random distances. The data from each recording unit are called up individually by the central unit and transmitted as a complete block via the data line. Basically, an unlimited number of recording units can be connected this way. Synchronization of transmitter and recording unit occurs via an external trigger or via extremely accurate clocks. The analog part of a recording unit is represented in FIG. 4 as block circuit diagram. It consists of various filter and amplifier stages. Next, the signal goes through a radio frequency filter RF (9), then through a low-pass LP (12), then through a receiving amplifier IA (13), in which additionally an automatic drift correction BC (10) occurs. A notch filter NF (15) follows and finally an impedance converter IMA (16) with a second drift control BC (10). Subsequently, the signal goes through a yield point amplifier in the digital part of the recording unit. All filter and amplifier stages are microprocessor controlled. A microprocessor-generated test signal can be given directly to the input following digital/analog D/A (11) conversion. In this way, units (12–16) can be checked.

For drift control BC (10), the microprocessor determines correction values from time windows of the input signals. The corrections are made before the next transient is received.

Figure 5:
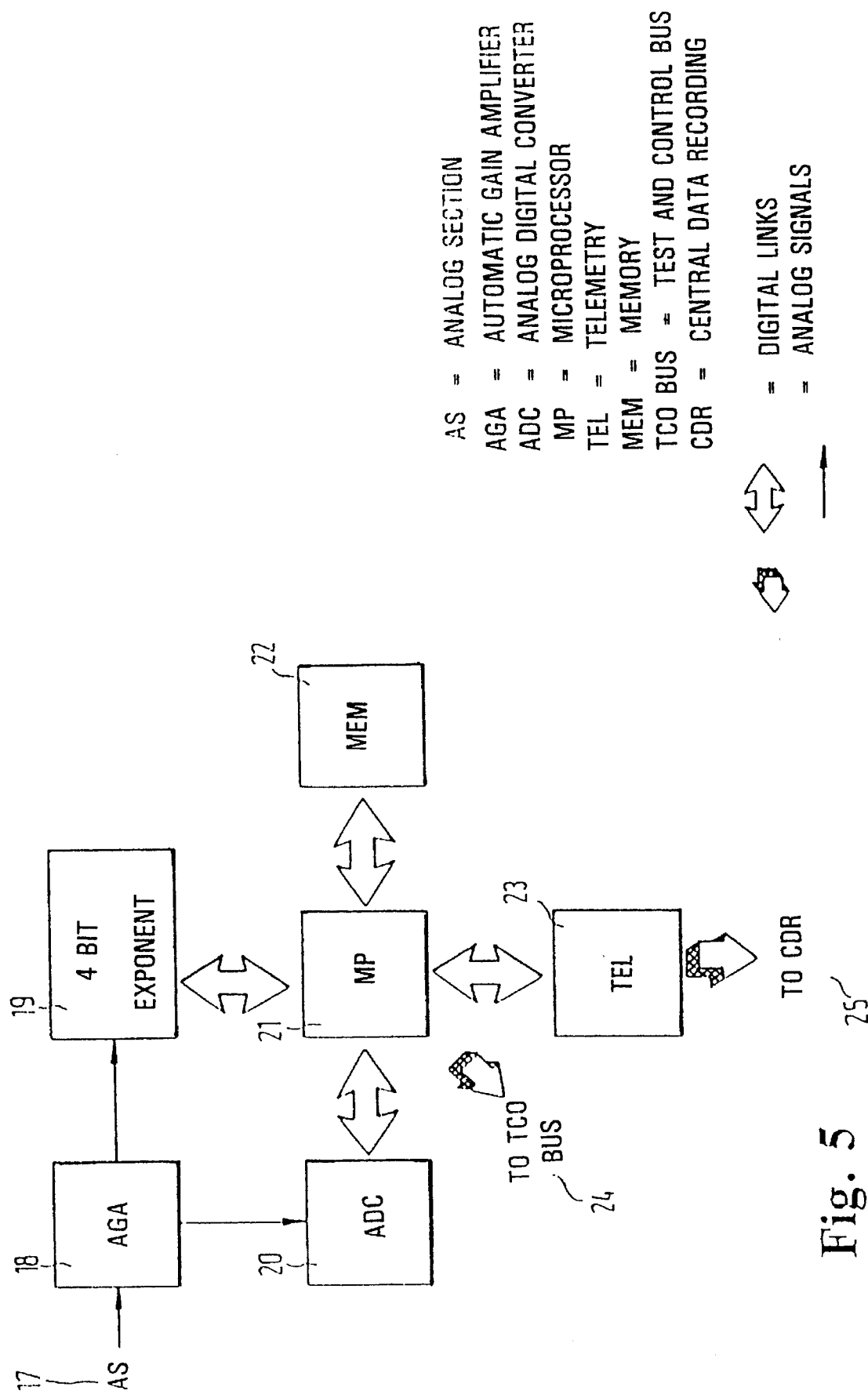

FIG. 5 shows the digital part of the recording unit. The interface to the analog part is formed by the yield point amplifier AS (17), which enables amplifications between 0 dB and 90 dB, in the form of an automatic amplification regulator AGA (18) and of a 4 bit electronic exponent (19). The output of automatic amplifier AGA (18) is digitized in the analog/digital converter ADC (20), while the 4 bit exponent is taken over directly by microprocessor MP (21). The microprocessor stores the data in the memory and waits for the data call up by central unit DR (25), in order to transmit the data as a block into telemetry TEL (23) to central unit DR (25). Microprocessor MP (21) simultaneously controls the adjustment of the analog part, such as amplifier, filter and test signal via test & control bus TCO (24).

We claim:

1. A method for obtaining data from subsoil using a geophysical exploration installation having a transmitter in a grounded dipole, a central processing unit for processing the obtained data, and a plurality of recording units connected to the central processing unit by a telemetric link, each of the recording units having a plurality of measuring points, the method comprising the steps of:

transmitting electromagnetic transients into the subsoil from the transmitter;

receiving and measuring expanding induction currents using the plurality of recording units to obtain measuring values, the expanding induction currents being produced in the subsoil as a result of the electromagnetic transients transmitted into the subsoil from the transmitter;

digitizing and storing the measuring values as stored data in each recording unit at the measuring points; and transmitting the stored data from one recording unit at a time to the central processing unit in a predetermined sequence via the telemetric link for further geophysical processing.

2. The method of claim 1, wherein the step of transmitting the data from the recording units includes transmitting the data in blocks for subsequent storage in the central processing unit.

3. A method for obtaining data from subsoil using a geophysical exploration installation having a transmitter in a grounded dipole, a central processing unit for processing the obtained data, and a plurality of recording units connected to the central processing unit by a telemetric link, each of the recording units having a plurality of measuring points and a yield point amplifier, the method comprising the steps of:

transmitting electromagnetic transients into the subsoil from the transmitter;

receiving and measuring expanding induction currents using the plurality of recording units to obtain measuring values, the expanding induction currents being produced in the subsoil as a result of the electromagnetic transients transmitted into the subsoil from the transmitter;

processing the measuring values, wherein the measuring values are processed and digitized with the yield point amplifier;

storing the digitized measuring values as stored data in each recording unit at the measuring points; and transmitting the stored data in blocks from one recording unit at a time to the central processing unit in a predetermined sequence via the telemetric link for storing the data therein and further geophysical processing.

4. The method of claim 3, wherein the step of processing the measuring values further includes automatic drift correction 5. The method of claim 4, further including the step of installing a microprocessor at each recording unit to process the measuring values and to store and relay the data to the central processing unit, each microprocessor monitoring and controlling the performance and settings of its respective recording unit through a test and control bus 6. The method of claim 5 further including the step of synchronizing the transmitter and each recording unit by one of an external trigger operatively linked with each of the transmitter and each recording unit or by installation of synchronized timing devices at each of the transmitter and each recording unit.

7. The method of claim 1 further including the step of synchronizing the transmitter and each recording unit by one of an external trigger operatively linked with each of the transmitter and each recording unit or by installation of synchronized timing devices at each of the transmitter and each recording unit.

8. A method for obtaining data from subsoil using a geophysical exploration installation having a transmitter in a grounded dipole, a central processing unit for processing the obtained data, and a plurality of recording units connected to the central processing unit by a telemetric link, each of the recording units having a plurality of measuring points and a yield point amplifier, the method comprising the steps of:

transmitting electromagnetic transients into the subsoil from the transmitter;

receiving and measuring expanding induction currents using the plurality of recording units to obtain measuring values, the expanding induction currents being produced in the subsoil as a result of the electromagnetic transients transmitted into the subsoil from the transmitter;

processing the measuring values, wherein the measuring values are processed and digitized with the yield point amplifier;

storing the digitized measuring values as stored data in each recording unit at the measuring points; and transmitting the stored data from one recording unit at a time to the central processing unit in a predetermined sequence via the telemetric link for further geophysical processing.

9. The method of claim 8, wherein the step of processing the measuring values further includes automatic drift correction.

10. The method of claim 1, further including the step of processing the measuring values by performing automatic drift correction.

11. The method of claim 3, further including the step of installing a microprocessor at each recording unit to process the measuring values and to store and relay the data to the central processing unit, each microprocessor monitoring and controlling the performance and settings of its respective recording unit through a test and control bus.

12. The method of claim 2, further including the step of installing a microprocessor at each recording unit to process the measuring values and to store and relay the data to the central processing unit, each microprocessor monitoring and controlling the performance and settings of its respective recording unit through a test and control bus.

13. The method of claim 1, further including the step of installing a microprocessor at each recording unit to process the measuring values and to store and relay the data to the central processing unit, each microprocessor monitoring and controlling the performance and settings of its respective recording unit through a test and control bus.

14. The method of claim 1, wherein the telemetric link is a radio link.

15. The method of claim 1, wherein the recording units are located on a surface of a geophysical area to be explored.

16. The method of claim 1, wherein the recording units are located on a surface of a geophysical area to be explored and the telemetric link is a radio link.

17. The method of claim 1, wherein each of the measuring points of each of the recording units measure different components of electric and magnetic fields originating from the expanding induction currents.

18. The method of claim 3, wherein each of the measuring points of each of the recording units measure different components of electric and magnetic fields originating from the expanding induction currents.

19. The method of claim 8, wherein each of the measuring points of each of the recording units measure different components of electric and magnetic fields originating from the expanding induction currents.

20. The method of claim 8, wherein the recording units are located on a surface of a geophysical area to be explored and the telemetric link is a radio link.

* * * * *